Aug. 15, 1933. F. E. WOOD 1,922,515
NUT CRACKER
Filed Dec. 12, 1931
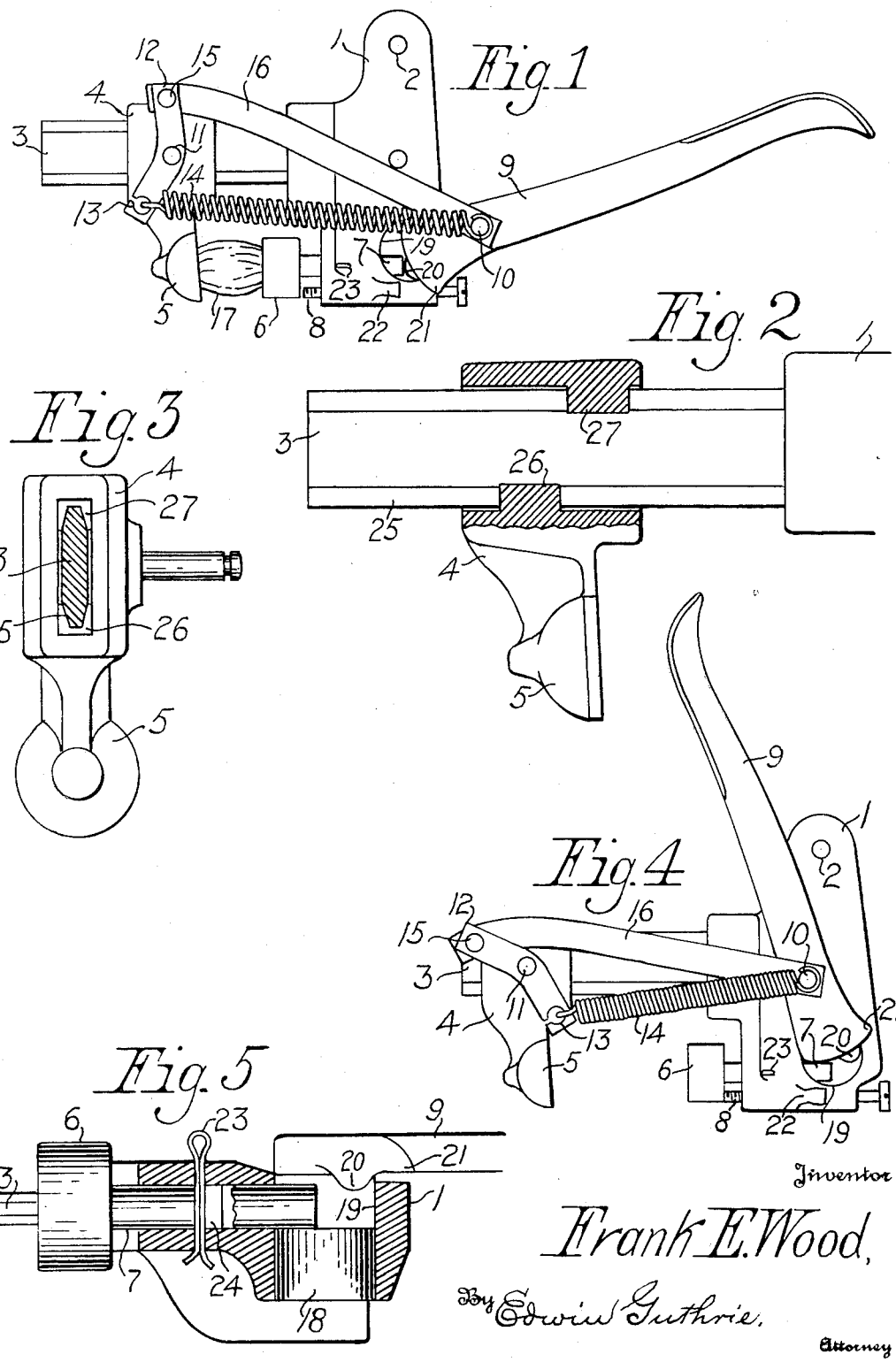
Inventor
Frank E. Wood,
By Edwin Guthrie.
Attorney Patented Aug. 15, 1933

1,922,515

UNITED STATES PATENT OFFICE 1,922,515

NUT CRACKER

Frank E. Wood, Girard, Pa.

Application December 12, 1931
Serial No. 580,687

9 Claims. (Cl. 146—16)

This invention relates to nut crackers, and was invented with the purpose in view of cracking the nuts speedily, keeping the meat whole, taking care of the different lengths and sizes of nuts automatically, and operating with a minimum of labor.

The invention consists of parts of special construction and arrangement, whereby it is believed that the nut holding heads or cups may be separated or brought together upon a nut quickly, and whereby after the nut is held in place between the heads, the cracking pressure applied may be limited in force as well as in extent. It is believed that this invention is particularly effective and time saving when it is desired to open a considerable number of nuts such as pecans without mutilating the kernels to such a degree as to render them unsightly or unsalable.

In the accompanying drawing is illustrated the forms and disposition of the parts of this invention. Fig. 1 represents a side view of all parts assembled showing a nut engaged. Fig. 2 is a detail view of the post, showing the slide in section. Fig. 3 is a top view of the slide with the post therein shown in section. Fig. 4 is a side view showing all parts assembled, and the heads or cups separated. Fig. 5 is a vertical section of the lower portion of the support showing the rotative cylindrical termination of the operating handle.

Throughout the drawing and description the same number is used to refer to the same part.

Considering the drawing a casting 1, of any selected shape constitutes the supporting body for the various members. The support may be secured to a table or the like by means of the screw holes 2. In the drawing the invention is shown in a horizontal attitude, in order that the cracked nuts may drop out into a suitable receptacle, not shown, when the heads are separated. It is not intended to confine the invention to any particular position or size or exact formation of parts.

To the support 1 is secured a post 3, and a slide 4 is movable upon the post. The slide carries a head or cup 5, and a corresponding head 6 provided with a stem 7 is movably borne by the support 1 as best shown in Fig. 4. Passing through the support near the end thereof is an adjusting screw 8, which can be arranged to limit the movement of the stem 7 and the cup 6 in one direction.

The invention is operated by means of a handle 9 pivotally carried by the support, and having a projecting pin 10. It will be here noted that the slide 4 has a similar pin 11, and an angular rocking plate 12 pivotally engages pin 11. At one end of the plate is an opening 13 provided with an entrance for an end loop or ring of the spring 14, the other end of which engages the pin 10 on handle 9. The rocking plate 12 has at its other end a pin 15 which pivotally engages the end of a connecting bar 16, and the remaining end of this bar is pivotally engaged with the pin 10 on the handle. A nut 17 may be held for cracking as set out in Fig. 1, or dropped by separating the heads 5 and 6 as illustrated in Fig. 4.

The end of the handle 9, usually the larger end as drawn, is constructed with a cylindrical termination 18 that rotatively fits a corresponding opening 19 in the support 1. The construction is best illustrated in Fig. 5, practically full size. Upon the pivoted end of the handle 9 is a raised and rounded lug 20, and as the handle is pressed downwardly into the cracking position the lug 20 moves against the stem 7 of the lower head 6 and further presses the head against the nut. The same end of the handle has the point 21, and an excessive movement of the handle brings the point 21 into contact with the stop 22 thus arresting the handle movement.

In Fig. 5 is best shown a cotter pin passing through a slot 24 in the stem 7 of the head 6, to limit the movements of the stem.

As best illustrated in Figs. 2 and 3, the post 3 is formed with beveled or V-shaped edges 25 and the slide 4 is provided interiorly with the correspondingly V-shaped grips or guides 26 and 27.

In the operation of this invention, the parts being arranged as shown in Fig. 4, upon moving the handle the slide is very quickly brought into position holding the nut as illustrated in Fig. 1. Further movement of the handle trips the toggle joint and rocks the plate 12, thus stretching the spring and making allowance for different lengths of nuts between the heads 5 and 6. When the head 6 is moved by the pressure of the lug 20 on the handle a cracking force is exerted upon the nut, and the same force tends to raise the head 5 on slide 4. But, the pressure upon head 5 causes the grips 26 and 27 to take hold of the edges 25 of the post very firmly by wedge action, and the head 5 is not displaced. When the nut has been cracked, the heads are separated very quickly, and the nut drops from between them. It will be noted that the grips will hold any place on the post.

It is not essential that heads 5 and 6 be cup shaped, as heads of different shape may be introduced for other purposes demanding a pressing action.

Having now described this invention, I claim:—

1. In a nut cracker, the combination with a support, of a post upon the support, a slide movable on the post, a handle pivoted upon the support, a rocking plate pivoted upon the slide, a connecting bar pivotally joining one end of said plate and the said handle, a spring connecting the opposite end of the plate and the said handle, a nut holding head carried by the slide, and a corresponding head carried by the support.

2. In a nut cracker, the combination with a support, of a post upon the support, a slide movable on the post, a handle pivoted upon the support, the said post having beveled edges engaging the slide, said slide being formed interiorly to engage the post, a rocking plate pivoted upon the slide, a connecting bar pivotally connected with said handle and with one end of said plate, a spring connecting the remaining end of said plate and said handle, a nut holding head carried by the slide, and a corresponding head carried by the said support.

3. In a nut cracker, a support, in combination with a post upon the support, a slide movable on the post, a handle pivoted upon the support, an angular rocking plate pivoted between its ends to the slide, a connecting bar pivotally joining one end of said plate and the said handle, a nut holding head carried by the slide, a corresponding head carried by the support, and a spring connecting the said handle and the remaining end of the said rocking plate.

4. In a nut cracker, a support, in combination with a post upon the support, a slide movable on the post, a handle pivoted upon the support, a rocking plate pivoted to the said slide between the ends of the plate, a connecting bar pivotally joining one end of said plate and the said handle, a spring connecting the remaining end of the plate and the said handle, a nut holding head carried by the slide, a corresponding head movably carried by the said support, and means for adjusting the distance of the said movable head from the said support, and a handle stopping device.

5. In a nut cracker, the combination with two opposed nut holding heads, of a supporting body, means carried by the supporting body for moving the said heads including a handle, the said support having a cylindrical opening, the said handle having a cylinder movably fitting said opening and extending part way through the opening, one of said heads having a stem extending downwardly in the said support adjacent to the said cylinder of the handle to keep the said cylinder in the said opening in rotative relation, means for limiting the lengthwise movement of said stem of the head, and the said handle having a projecting portion arranged to act upon the lower end of said stem to force same upwardly.

6. In a nut cracker, the combination with a support, of a post secured to the support, a slide movable upon the post, said slide having interiorly wedging V-shaped grips formed to engage the edges of the post, a handle pivoted upon the support, a rocking plate pivoted upon the slide, a connecting bar pivotally joining one end of the said plate and the handle, a spring connecting the other end of said plate and the handle, a nut holding head carried by the slide, and a corresponding head carried by said support.

7. In a nut cracker, the combination with a support, of a post secured to the support, a slide movable upon the post, said slide having interiorly off-set grips formed to engage the edges of the post, a handle pivoted upon the support, an angular rocking plate pivoted between its ends to the slide, a connecting bar pivotally joining one end of said plate and said handle, a nut holding head carried by the slide, a corresponding head carried by the support, and a spring connecting the handle and the remaining end of said plate.

8. In a nut cracker, a support, in combination with a support of a post secured to the support, a slide movable upon the post, said slide having interiorly spaced off-set grips on opposite sides formed to engage the edges of the post, a handle pivoted upon the said support, a rocking plate pivoted to the said slide between the ends of the plate, a connecting bar pivotally joining one end of said plate and said handle, a spring connecting the remaining end of the plate and said handle, a head carried by the slide and a corresponding head carried by the support.

9. In a nut cracker, the combination with two opposed nut-holding heads, of a supporting body, means carried by the supporting body for moving one head with respect to the other and including an operating handle, the said supporting body having a cylindrical opening, the said handle having a cylindrical portion movably fitting said opening and extending part of the way through the opening, one of said heads having a stem extending into the said support adjacent to the said cylinder of the handle to keep the cylinder in the opening in rotative relation, means for limiting the longitudinal movement of the said stem, and the said handle having a projecting lug arranged to act upon the end of said stem and to exert nut cracking pressure upon the head of the stem.

FRANK E. WOOD.